United States Patent [19]

Chundury et al.

[11] Patent Number: 5,264,280
[45] Date of Patent: Nov. 23, 1993

[54] MULTILAYER THERMOFORMABLE STRUCTURE

[75] Inventors: Deenadayalu Chundury, Newburgh, Ind.; Anthony S. Scheibelhoffer, Norton, Ohio; Berdine L. Leonard, Macedonia, Ohio; Ronald E. Thompson, Parma, Ohio; Randall S. McAllister, Evansville, Ind.; Surachai Wimolkiatisak, North Royalton, Ohio; Anthony F. Dean, Jr., Cuyahoga Falls, Ohio

[73] Assignee: Ferro Corporation, Cleveland, Ohio

[21] Appl. No.: 948,080

[22] Filed: Sep. 21, 1992

[51] Int. Cl.$^5$ .................. B32B 27/08; C08L 53/02
[52] U.S. Cl. .................. 428/330; 428/331; 428/387; 428/517; 428/519; 525/98
[58] Field of Search ............. 428/515, 330, 331, 517, 428/519, 387

[56] References Cited

U.S. PATENT DOCUMENTS

| | | | |
|---|---|---|---|
| 4,006,116 | 2/1977 | Dominguez | 260/33.6 |
| 4,386,187 | 5/1983 | Grancio et al. | 525/96 |
| 4,386,188 | 5/1983 | Grancio et al. | 525/96 |
| 4,464,439 | 8/1984 | Castelein | 428/517 |
| 4,525,533 | 6/1985 | Bertrand et al. | 525/98 |
| 4,837,074 | 6/1989 | Rosinski et al. | 428/220 |
| 4,868,245 | 9/1989 | Pottick et al. | 525/98 |
| 5,003,005 | 3/1991 | Vitkuske et al. | 525/89 |
| 5,003,007 | 3/1991 | Vitkuske et al. | 525/98 |
| 5,017,436 | 5/1991 | Schwarz et al. | 428/519 |
| 5,104,938 | 4/1992 | Toyama et al. | 525/92 |

FOREIGN PATENT DOCUMENTS

| | | |
|---|---|---|
| 0289926 | 11/1988 | European Pat. Off. |
| 0310051 | 4/1989 | European Pat. Off. |
| 9005759 | 5/1990 | PCT Int'l Appl. |

*Primary Examiner*—P. C. Sluby
*Attorney, Agent, or Firm*—Rankin, Hudak & Hill

[57] ABSTRACT

This invention relates to a multilayer thermoformable structure comprising (A) at least one cap layer and (B) at least one core layer, and polymer compositions for making the same. The multilayer structures and polymer compositions of the invention are useful in preparing thermoformed articles and are particularly useful in preparing liners for refrigerators and freezers. The multilayer structures and the polymer composition have good thermoformability and chemical resistance. The multilayer structures and the polymer composition have good surface properties including a glossy finish. Further these materials are compatible with new blowing agents, such as the hydrochlorofluorocarbons and hydrofluorocarbon blowing agents, which are more environmentally friendly. The layers of the multilayer structure do not require a glue layer.

13 Claims, No Drawings

MULTILAYER THERMOFORMABLE STRUCTURE

TECHNICAL FIELD OF THE INVENTION

This invention relates to multilayer structures, such as laminants, and polymer composition for making the same.

BACKGROUND OF THE INVENTION

The multilayer structures and the blended polymer compositions of this invention may be used in a variety of applications including refrigeration parts, such as inner liners, inner door panels, inner trim, trays and shelves, etc. The multilayered structures and the blended polymers are useful in preparing parts for: the automotive industry; communications such as telephones, radio, TV, cassettes, etc.; power tools; appliances; business machines; toys; furniture; etc. The multilayered structure and polymers must provide a good quality surface which has a glossy finish and is resistant to chemicals and scuffing.

When preparing multilayer structures, the layers of the structures must adhere to each other. If the layers of the structure do not adhere to each other a glue, or tie layer is used to stick the layers of the structure together. Layers which adhere to each other without a glue layer are useful.

The concerns about the environmental affects of chlorofluorocarbons (CFCs) on the earth's ozone layer have led to the development of blowing or foaming agents for foams, such as polyurethane foams used as insulation. The new blowing agents contain little or no chlorine. One problem associated with the new blowing agents is their chemical attack on the linings of refrigerators and freezers. A stable and chemically resistant lining material for refrigerators and freezers is needed.

SUMMARY OF THE INVENTION

This invention relates to a multilayer thermoformable structure comprising (A) at least one cap layer of a polymer composition comprising (i) at least about 55% by weight of a homopolymer of a vinyl aromatic monomer, or a polymer of a vinyl aromatic monomer and at least one monomer selected from the group consisting of a mono- or dicarboxylic reagent and other vinyl monomers, (ii) from about 0% to about 45% by weight of at least one block polymer of a vinyl aromatic monomer and an aliphatic conjugated diene, a selectively hydrogenated derivative thereof, or a selectively hydrogenated derivative thereof to which has been grafted a unsaturated carboxylic reagent, wherein the block polymer contains up to about 50% by weight bound styrene, and (iii) from about 0% to about 45% by weight of at least one block polymer of a vinyl aromatic monomer and a conjugated diene, a partially hydrogenated derivative thereof, or a selectively hydrogenated derivative thereof to which has been grafted a unsaturated carboxylic reagent, wherein the block polymer contains greater than about 60% by weight bound vinyl aromatic monomer, with the proviso that the cap layer includes at least one of (Aii) or (Aiii); and (B) at least one core layer selected from the group consisting of (1) at least one polymer composition comprising (i) from about 50% to about 80% by weight of at least one polyolefin, (ii) from about 10% to about 30% by weight of a polymer of a vinyl aromatic compound and an unsaturated dicarboxylic acid anhydride or imide, or mixtures thereof; and (iii) from about 5% to about 20% by weight of a block polymer of a vinyl aromatic compound and a conjugated diene, a partially hydrogenated derivative thereof, or a selectively hydrogenated derivative thereof to which has been grafted a unsaturated carboxylic reagent;

(2) at least one polymer composition comprising (i) from about 50% to about 80% by weight of a polyolefin, (ii) from about 10% to about 30% by weight of a homopolymer of a vinyl aromatic monomer, or a polymer of a vinyl aromatic monomer and at least one monomer selected from the group consisting of acrylic acid or ester, methacrylic acid or ester, acrylonitrile and maleic anhydride; (iii) from about 5% to about 20% by weight of at least one block polymer of a vinyl aromatic monomer and an aliphatic conjugated diene, a partially hydrogenated derivative thereof, or a selectively hydrogenated derivative thereof to which has been grafted a unsaturated carboxylic reagent;

(3) at least one polymer composition comprising (i) from about 70% by weight of at least one polyolefin, (ii) from about 5% to about 30% by weight of a block polymer of a vinyl aromatic compound and a conjugated diene, a partially hydrogenated derivative thereof, or a selectively hydrogenated derivative thereof to which has been grafted a unsaturated carboxylic reagent, wherein the block polymer is derived from at least about 60% by weight bound vinyl aromatic monomer; and (iii) from about 0.3% to about 15% by weight of a block polymer of a vinyl aromatic compound and a conjugated diene, a partially hydrogenated derivative thereof, or a selectively hydrogenated derivative thereof to which has been grafted a unsaturated carboxylic reagent, wherein the polymer is derived from up to about 50% by weight bound vinyl aromatic monomer.

The invention also relates to a polymer composition useful in making multilayered structures. The polymer composition includes a polymer composition comprising (i) at least about 55% by weight of a homopolymer of a vinyl aromatic monomer, or a polymer of a vinyl aromatic monomer and at least one monomer selected from the group consisting of a mono or dicarboxylic reagent, (ii) from about 1% to about 45% by weight of at least one block polymer of a vinyl aromatic monomer and an aliphatic conjugated diene, a selectively hydrogenated derivative thereof, or a selectively hydrogenated derivative thereof to which has been grafted a unsaturated carboxylic reagent, wherein the block polymer contains up to about 50% by weight bound styrene, and (iii) from about 0.3% to about 45% by weight of at least one block polymer of a vinyl aromatic monomer and a conjugated diene, a partially hydrogenated derivative thereof, or a selectively hydrogenated derivative thereof to which has been grafted a unsaturated carboxylic reagent, wherein the block polymer contains greater than about 60% by weight bound vinyl aromatic monomer; and a polymer composition comprising (i) from about 70% by weight of at least one polyolefin, (ii) from about 5% to about 30% by weight of a block polymer of a vinyl aromatic compound and a conjugated diene, or a partially hydrogenated derivative thereof, wherein the block polymer is derived from at least about 60% by weight bound vinyl aromatic monomer; and (iii) from about 0.3% to about 15% by weight of a block polymer of a vinyl aromatic compound and a conjugated diene, or a partially hydrogenated derivative thereof, wherein the polymer is derived from up to about 50% by weight bound vinyl aromatic monomer.

The multilayer structures and polymer compositions of the invention are useful in preparing thermoformed articles and are particularly useful in preparing liners for refrigerators and freezers. The multilayer structures and the polymer composition have good thermoformability and chemical resistance. The multilayer structures and the polymer composition have good surface properties including a glossy finish. Further these materials are compatible with new blowing agents, such as the hydrochlorofluorocarbon and hydrofluorocarbon blowing agents, which are more environmentally friendly. The layers of the multilayer structure do not require a glue layer and are generally recyclable.

DESCRIPTION OF THE PREFERRED EMBODIMENTS

Unless the context indicates otherwise, throughout the specification and claims, the amount of the polymers present is determined exclusive of filler or other non-polymer additive in the polymer compositions. Therefore the amount of each polymer is determined by dividing the weight of the polymer by the combined weight of all polymers present in the composition.

Cap Layer (A)

The multilayer structure has a cap layer (A). This cap layer comprises a polymer composition comprising (i) at least about 55% by weight of a homopolymer of a vinyl aromatic monomer, or a polymer of a vinyl aromatic monomer and at least one monomer selected from the group consisting of a mono- or dicarboxylic reagent and other vinyl monomers, (ii) from about 0% to about 45% by weight of at least one block polymer of a vinyl aromatic monomer and an aliphatic conjugated diene, a selectively hydrogenated derivative thereof, or a selectively hydrogenated derivative thereof to which has been grafted a unsaturated carboxylic reagent, wherein the block polymer contains up to about 50% by weight bound styrene, and (iii) from about 0% to about 45% by weight of at least one block polymer of a vinyl aromatic monomer and a conjugated diene, a partially hydrogenated derivative thereof, or a selectively hydrogenated derivative thereof to which has been grafted a unsaturated carboxylic reagent, wherein the block polymer contains greater than about 60% by weight bound vinyl aromatic monomer, with the proviso that the cap layer includes at least one of (Aii) or (Aiii).

In one embodiment, the cap layer is prepared from polymer compositions which are free of polyamides, e.g. nylon polymers. In another embodiment, the cap layer polymer compositions are free of polyurethane. In another embodiment, the cap layer polymer compositions are free of polyphenylene ether resins. In another embodiment, the cap layer is contains less than 30%, or about 20%, or about 10% by weight polyolefin, such as polymers of ethylene and polypropylene. In another embodiment, the cap layer is free of polyolefin.

Polymers of Vinyl Aromatic Monomers (Ai)

The multilayer structures may include a homopolymer of a vinyl aromatic monomer, or a polymer of a vinyl aromatic monomer and at least one monomer selected from the group consisting of acrylic acid or ester, methacrylic acid or ester, acrylonitrile and maleic anhydride. (Ai) is generally present in an amount from about 50%, or about 55%, or about 60% up to about 85%, or to about 80%, or to about 75%, or to about 72% by weight.

The vinyl aromatic monomer includes styrene and the various substituted styrenes. In one embodiment, the vinyl aromatic monomer is represented by the following formula

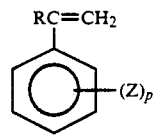

wherein R is hydrogen, an alkyl group consisting from 1 to about 6 carbon atoms, or halogen; Z is a member selected from the group consisting of vinyl, halogen and alkyl groups containing from 1 to about 6 carbon atoms; and p is a whole number from 0 up to the number of replaceable hydrogen atoms on the phenyl nucleus. Specific examples of vinyl aromatic compounds such as represented by the above formula include, for example, in addition to styrene, alpha-methylstyrene, beta-methylstyrene, vinyl toluene, 3-methylstyrene, 4-methylstyrene, 4-isopropylstyrene, 2,4-dimethylstyrene, o-chlorostyrene, p-chlorostyrene, o-bromostyrene, 2-chloro-4-methylstyrene, etc. Styrene is the preferred vinyl aromatic compound.

Specific examples of polymers of vinyl aromatic compounds include polystyrene, poly(alpha-methylstyrene), poly(p-methylstyrene) and high impact polystyrene (HIPS). Polystyrene is a preferred vinyl aromatic homopolymer. A commercially available polystyrene, which is useful in this invention is Dart 108 polystyrene from Dart Polymer Inc.

In another embodiment, (Ai) is a polymer of a vinyl aromatic monomer and a monomer selected from the group consisting of an unsaturated mono- or dicarboxylic reagent and other vinyl monomers. The carboxylic reagents include carboxylic acids per se and their functional derivatives such as anhydrides, imides, metal salts, esters, etc., which are capable of being forming polymers with the vinyl aromatic monomer.

The unsaturated monocarboxylic acid reagents are carboxylic acids and esters corresponding to the formula

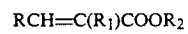

wherein R is hydrogen or a saturated aliphatic or alicyclic, aryl, alkaryl or heterocyclic group; $R_1$ is hydrogen or an alkyl group; and $R_2$ is hydrogen or an alkyl, aryl, or heterocyclic group. Preferably, R is hydrogen or an alkyl group containing from 1 to about 10 carbon atoms. Preferably, $R_1$ is hydrogen or an alkyl group containing from 1 to about 10 carbon atoms. Preferably, $R_2$ is hydrogen or an alkyl group having from 1 to about 10 carbon atoms. The total number of carbon atoms in R and $R_1$ should not exceed 18 carbon atoms. Specific examples of useful monobasic carboxylic reagents include acrylic acid, methacrylic acid, crotonic acid, acrylic anhydride, etc. Specific examples of esters include methyl, ethyl, propyl, and butyl acrylate and methacrylate.

In another embodiment, the unsaturated carboxylic reagent is a dicarboxylic reagent. An example of dicarboxylic reagents are maleic reagents. The maleic reagents may generally be represented by the formula

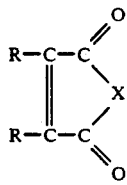

wherein each R group is hydrogen or an aliphatic or aromatic hydrocarbyl group or the two R groups are joined together to form a fused ring derivative, X is —O— or >NR$^2$ where R$_2$ is a hydrocarbyl group which may be an aliphatic or an aromatic hydrocarbyl group such as phenyl, methyl, ethyl, propyl, butyl, etc. Preferably both R groups are hydrogen.

Examples of maleic derivatives which are cyclic or bicyclic compounds include those obtained by a Diels-Alder reaction of butadiene with maleic anhydride or a maleimide. Those obtained by a Diels-Alder reaction of cyclopentadiene with maleic anhydride or maleimide, and those obtained by a Diels-Alder reaction of isoprene with maleic anhydride or an N-substituted maleimide. These cyclic or bicyclic derivatives have high glass transition temperatures. Examples of dicarboxylic reagents include maleic acid, maleic anhydride, fumaric acid, mesaconic acid, itaconic acid, citraconic acid, itaconic anhydride, citraconic anhydride, monomethyl maleate, monosodium maleate, etc.

The copolymers of the vinyl aromatic monomers with maleic anhydride, N-substituted maleimides or metal salts of maleic acid are obtained, in one embodiment, by polymerizing equimolar amounts of styrene and the co-reactant, with or without one or more interpolymerizable comonomers. In another embodiment, substantially homogeneous copolymers of styrene with maleic anhydride or maleimide or metal salts of maleic acid can be obtained by (1) heating a vinyl aromatic monomer to a temperature at which the vinyl aromatic monomer will polymerize, (2) stirring the polymerizing vinyl aromatic monomer while (3) adding maleic anhydride, maleimide, or the metal salt of maleic acid, or mixtures thereof at a continuous and uniform rate. Generally, the addition of the maleic anhydride, maleimide, or metal salts or esters of maleic acid is made at a rate in moles per unit time that is slower than the rate, in moles per unit time at which the vinyl aromatic monomer is polymerizing. Procedures for preparing such copolymers are known in the art and have been described in, for example, U.S. Pat. No. 2,971,939.

In one embodiment, (Ai) is a styrene-maleic anhydride copolymer. The styrene-maleic anhydride copolymers (SMA) are available commercially from, for example, ARCO under the general trade designation Dylark. Examples include: Dylark DBK-290 reported to comprise about 18% by weight of maleic anhydride and about 82% by weight of styrene; Dylark 332 reported to comprise about 14% by weight of maleic anhydride and 86% by weight of styrene; and Dylark 134 reported to comprise about 17% by weight of maleic anhydride, the balance being styrene.

Other Dylark materials available include transparent grades: Dylark 132 (Vicat 109° C.), Dylark 232 (Vicat 123° C.), and Dylark 332 (Vicat 130° C.). Impact grades include Dylarks 150, 250, 350 and 700 which are believed to be blends and/or grafts of SMA with SBR.

Other examples of impact modified styrenic and alpha-methyl styrene copolymers with maleic anhydride and acrylonitrile include Arvyl 300 MR and 300 CR.

Low molecular weight styrene-maleic anhydride copolymers (Mw as low as 1500) also are useful and these are available commercially such as from Monsanto under the designation "Scripset" and from Atochem under the designation "SMA Resins". Sulfonated styrene-maleic anhydride copolymers (and their metal salts) also are available and useful in this invention. Two such products are available from Atochem: SSMA-1000 which is a sulfonated copolymer of about 50% styrene and 50% maleic anhydride; and SSMA 3000, a sulfonated SMA comprising about 75% styrene and 25% maleic anhydride.

Specific examples of copolymers of vinyl aromatic compounds include: styrene-acrylonitrile (SAN); styrene-acrylic acid; and styrene methacrylic acid.

Block Polymers (Aii)

The multilayered structure also includes a block polymer of a vinyl aromatic monomer and a conjugated diene, a partially hydrogenated derivative thereof, or a selectively hydrogenated derivative thereof to which has been grafted a unsaturated carboxylic reagent. The block polymer of a vinyl aromatic monomer and an aliphatic conjugated diene (Aii) is typically present in an amount from about 10%, or about 15% up to about 30%, or to about 25% by weight of the polymer composition. The block polymer (Aii) contains up to about 50% bound vinyl aromatic monomer. In one embodiment, (Aii) contains up to about 48%, or to about 45% bound vinyl aromatic monomer.

The block polymers, usually block copolymers, may be diblock, triblock, multiblock, starblock, polyblock or graftblock polymers. Throughout this specification and claims, the terms diblock, triblock, multiblock, polyblock, and graft or graft-block with respect to the structural features of block polymers are to be given their normal meaning as defined in the literature such as in the Encyclopedia of Polymer Science and Engineering, Vol. 2, (1985) John Wiley & Sons, Inc., New York, pp. 325-326, and by J. E. McGrath in *Block Copolymers, Science Technology*, Dale J. Meier, Ed., Harwood Academic Publishers, 1979, at pages 1-5.

Such block polymers may contain various ratios of conjugated dienes to vinyl aromatic monomer. Accordingly, multi-block polymers may be utilized which are linear or radial symmetric or asymmetric and which have structures represented by the formulae A—B, A—B—A, A—B—A—B, B—A—B, (AB)$_{0,1,2}$ . . . BA, etc., wherein A is a polymer block of a vinyl aromatic monomer or a conjugated diene/vinyl aromatic monomer tapered polymer block, and B is a polymer block of a conjugated diene.

The block polymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As well known, tapered polymer blocks can be incorporated in the multi-block copolymers by copolymerizing a mixture of conjugated diene and vinyl aromatic monomer monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Conjugated dienes which may be utilized to prepare the polymers and copolymers are those containing from 4 to about 10 carbon atoms and more generally, from 4 to 6 carbon atoms. Examples include from 1,3-butadiene, 2-methyl-1,3-butadiene (isoprene), 2,3-dimethyl-1,3-butadiene, chloroprene, 1,3-pentadiene, 1,3-hexadiene, etc. Mixtures of these conjugated dienes also may be used. The preferred conjugated dienes are isoprene and 1,3-butadiene.

The vinyl aromatic monomers which may be utilized to prepare the copolymers are described above. The preferred vinyl aromatic monomer is styrene.

Many of the above-described polymers of conjugated dienes and vinyl aromatic compounds are commercially available. The number average molecular weight of the block polymers, prior to hydrogenation, is from about 20,000 to about 500,000, preferably from about 40,000 to about 300,000.

The average molecular weights of the individual blocks within the polymers may vary within certain limits. In most instances, the vinyl aromatic block will have a number average molecular weight in the order of about 2000 to about 125,000, and preferably between about 4000 and 60,000. The conjugated diene blocks either before or after hydrogenation will have number average molecular weights in the order of about 10,000 to about 450,000 and more preferably from about 35,000 to 150,000.

Also, prior to hydrogenation, the vinyl content of the block polymer is from about 10 to about 80%, and the vinyl content is preferably from about 25 to about 65%, particularly 35 to 55% when it is desired that the modified block polymer exhibit rubbery elasticity. The vinyl content of the block polymer can be measured by means of nuclear magnetic resonance.

Specific examples of diblock polymers include styrene-butadiene, styrene-isoprene, and the hydrogenated derivatives thereof. Examples of triblock polymers include styrene-butadiene-styrene, styrene-isoprene-styrene, alpha-methylstyrene-butadiene-alpha-methylstyrene, alpha-methylstyrene- isoprene-alpha-methylstyrene, and their partially hydrogenated derivatives. The diblock and triblock polymers are commercially available from a variety of sources under various tradenames. An example of a commercially available diblock resin includes Solprene 314D (Phillips). A number of styrene-butadiene-styrene triblock polymers are sold by the Shell Chemical Company under the trademarks "Kraton 2103", "Kraton 2104", and "Kraton 2113". Such thermoplastic rubbery block polymers are made by anionic polymerization, and the above three identified Shell Kratons differ in molecular weight and viscosity, and also in the ratio of butadiene to styrene. For example, "Kraton 2103" and "Kraton 2113" have a styrene to butadiene ratio of 28:72 while "Kraton 2104" as a styrene to butadiene ratio of 30:70. Blends of diblock and triblock polymers are also available. Kraton 1118 (Shell) is a blend of SB diblock and SBS triblock polymers. A particularly useful styrene-butadiene block copolymer is Kraton G1701X.

Multiblock polymers of styrene and either isoprene or butadiene also are commercially available. Commercially available and preferred styrene-butadiene multiblock polymers include Stereon 841A (43% styrene:57% butadiene) and Stereon 845A which are available from The Firestone Tire & Rubber Company.

Radial or starblock copolymers are available from Fina under the general designation "Finaprene SBS Polymer". A particularly useful radial or starblock polymer is available commercially under the designation "Finaprene 414".

The selective hydrogenation of the block polymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or polymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block polymers which are carried out in a manner and to extent as to produce selectively hydrogenated polymers having a residual unsaturation content in the polydiene block from about 0.5 to about 20% of their original unsaturation content prior to hydrogenation.

In one embodiment, the conjugated diene portion of the block polymer is at least 90% saturated and more often at least 95% saturated while the vinyl aromatic portion is not significantly hydrogenated. Particularly useful hydrogenated block polymers are the hydrogenated block polymers of styrene-isoprene-styrene such as an (ethylene/propylene)-s-tyrene block polymer. When a polystyrene-polybutadiene-polystyrene block polymer is hydrogenated, it is desirable that the 1,2-polybutadiene to 1,4-polybutadiene ratio in the polymer is from about 30:70 to about 70:30. When such a block polymer is hydrogenated, the resulting product resembles a regular polymer block of ethylene and 1-butene (EB). As noted above, when the conjugated diene employed as isoprene, the resulting hydrogenated product resembles a regular polymer block of ethylene and propylene (EP). One example of a commercially available selectively hydrogenated is Kraton G-1652 which is a hydrogenated SBS triblock comprising 30% styrene end blocks and a midblock equivalent is a polymer of ethylene and 1-butene (EB). This hydrogenated block polymer is often referred to as SEBS.

In another embodiment, the selectively hydrogenated block polymer is of the formula $$B_n(AB)_oA_p$$

wherein
$n = 0$ or 1;
$o$ is 1 to 100;
$p$ is 0 or 1;
each B prior to hydrogenation is predominantly a polymerized conjugated diene hydrocarbon block having a number average molecular weight of about 20,000 to about 450,000;
each A is predominantly a polymerized vinyl aromatic monomer block having a number average molecular weight of from about 2000 to about 115,000; the blocks of A constituting about 5% to about 95% by weight of the polymer; and the unsaturation of the block B is less than about 10% of the original unsaturation. In other embodiments, the unsaturation of block B is reduced upon hydrogenation to less than 5% of its original value, and the average unsaturation of the hydrogenated block polymer is reduced to less than 20% of its original value.

The block polymers of the vinyl aromatic monomer and the conjugated diene may also be grafted with one or more of the above described unsaturated monocarboxylic or dicarboxylic reagents. The carboxylic reagents include carboxylic acids per se and their functional derivatives such as anhydrides, imides, metal salts, esters, etc., which are capable of being grafted onto the selectively hydrogenated block polymer. The grafted polymer will usually contain from about 0.2 to about 20%, and preferably from about 0.1 to about 10% by weight based on the total weight of the block polymer and the carboxylic reagent of the grafted carboxylic acid.

In order to promote the grafting of the carboxylic acid reagent to the hydrogenated block polymer, free radical initiators are utilized, and these initiators usually are either peroxides or various organic azo compounds. The amount of initiator utilized generally is from about 0.01% to about 5% by weight based on the combined weight of the combined polymer and the carboxylic reagent. The amount of carboxylic acid reagent grafted onto the block polymers can be measured by determining the total acid number of the product. The grafting reaction can be carried out by melt or solution mixing of the block polymer and the carboxylic acid reagent in the presence of the free radical initiator.

The preparation of various selectively hydrogenated block polymers of conjugated dienes and vinyl aromatic monomers which have been grafted with a carboxylic acid reagent is described in a number of patents including U.S. Pat. Nos. 4,578,429; 4,657,970; and 4,795,782, and the disclosures of these patents relating to grafted selectively hydrogenated block polymers of conjugated dienes and vinyl aromatic compounds, and the preparation of such compounds are hereby incorporated by reference. U.S. Pat. No. 4,795,782 describes and gives examples of the preparation of the grafted block polymers by the solution process and the melt process. U.S. Pat. No. 4,578,429 contains an example of grafting of Kraton G1652 (SEBS) polymer with maleic anhydride with 2,5-dimethyl-2,5-di(t-butylperoxy)hexane by a melt reaction in a twin screw extruder. (See Col. 8, lines 40-61.)

Examples of commercially available maleated selectively hydrogenated polymers of styrene and butadiene include Kraton FG1901X from Shell, often referred to as a maleated selectively hydrogenated SEBS polymer.

Block Polymers (Aiii)

The multilayered structure also includes a block polymer of a vinyl aromatic monomer and a conjugated diene, or a partially hydrogenated derivative thereof, or a selectively hydrogenated derivative thereof to which has been grafted a unsaturated carboxylic reagent. (Aiii) is generally present in an amount from about 5%, or about 8% up to about 20%, or to about 15% by weight. (Aiii) contains greater than 60% by weight bound vinyl aromatic monomer. In another embodiment, (Aiii) has greater than about 65%, or greater than about 70%, or greater than about 72% by weight bound vinyl aromatic monomer. The vinyl aromatic monomer and the conjugated diene are described above. (See Block Polymer (Aii)).

Examples of useful block polymers having greater than 60% by weight bound vinyl aromatic monomer include Phillips K Resins 03, 04 and 05, available from Phillips Petroleum Company. Generally, the K-Resins have a high polystyrene content such as about 75%, and these resins are transparent and rigid. One particularly preferred block polymer is K-Resin KR03 from Phillips. A similar material (75% styrene: 25% butadiene) is available from Fina under the designation "Finaclear 520".

Core Layer (B)

The multilayer structure also contains a core layer. This core layer may be prepared from one of three polymer compositions or polyolefins described herein, including polypropylene. The core layers are attached to the cap layer by means know to those in the art. In one embodiment the layer are attached without a glue, or tie, layer between the cap layer and the core layer.

Polymer Composition (B1)

The first polymer composition (B1) useful in preparing the core layer is a polymer composition comprising (i) from about 50% to about 80% by weight of at least one polyolefin, (ii) from about 10% to about 30% by weight of a polymer of a vinyl aromatic compound and an unsaturated dicarboxylic acid anhydride or imide, or mixtures thereof; and (iii) from about 5% to about 20% by weight of a block polymer of a vinyl aromatic compound and a conjugated diene, a partially hydrogenated derivative thereof, or a selectively hydrogenated derivative thereof to which has been grafted a unsaturated carboxylic reagent.

Polyolefins (B1i)

The polyolefins employed in the blends of the present invention generally are semi-crystalline or crystallizable olefin polymers including homopolymers, copolymers, terpolymers, or mixtures thereof, etc., containing one or more monomeric units. The polyolefins (B1i) is generally present in an amount from about 50%, or about 55%, or about 60% up to about 80%, or to about 75%, or to about 72% by weight.

Polymers of alpha-olefins or 1-olefins are preferred in the present invention, and these alpha-olefins may contain from 2 to about 20 carbon atoms. Alpha-olefins containing 2 to about 6 carbon atoms are preferred. Thus, the olefin polymers may be derived from olefins such as ethylene, propylene, 1-butene, 1-pentene, 4-methyl-1-pentene, 1-octene, 1-decene, 4-ethyl-1-hexene, etc. Examples of polyolefins include polypropylene, polyethylene, and ethylene propylene copolymers.

In one embodiment, the polyolefins include polypropylene and ethylene-propylene polymers. (B1i) is generally present in an amount from about 50%, or about 55%, or about 60% up to about 80%, or to about 75%, or to about 72% by weight. Propylene polymers may be semi-crystalline or crystalline in structure. The number average molecular weight of the propylene polymers is preferably above about 10,000 and more preferably above about 50,000. In addition, it is preferred in one embodiment that the apparent crystalline melting point be above about 75° C. and preferably between about 75° C. and about 250° C. The propylene polymers useful in preparing the polymer blends of the present invention are well-known to those skilled in the art and many are available commercially. Polypropylene are preferred propylene polymers, and polypropylenes such as Aristech F007S, Aristech F007F (homopolymers), and Shell's 7C06 or Exxon's PD7132 or Aristech's 4007F and 4040F (polypropylene-ethylene copolymers) are particularly preferred.

The propylene polymers include at least one copolymer of propylene and ethylene. The propylene ethylene copolymer will generally contain from about 1%, or about 4% to about 10%, or about 7% by weight of ethylene. In one embodiment, the ethylene content is about 6% by weight. In one embodiment, the propylene ethylene copolymer is a random copolymer.

Processes useful in preparing the propylene ethylene copolymers useful in preparing the present invention are well-known to those skilled in the art and many such copolymers are available commercially. Such random copolymers may be prepared by any of a number of methods known in the art including those set forth in the *Encyclopedia of Polymer Science & Engineering*, Vol. 13, 2nd edition, Wiley & Sons, pp. 500-et seq. (and footnotes cited therein), which is fully incorporated by reference herein. Propylene ethylene copolymers useful in the present invention are available commercially. Examples of these copolymers include Fina Y-8573 and Z-7650 available from Fina Oil and Chemical Company, Dallas, Tex., U.S.A. and Soltex 4208 available from Soltex Polymer Corporation, Houston, Tex., U.S.A.

Vinyl Aromatic Monomer/Carboxylic Reagent Copolymers (B1ii)

The polymer composition (B1) also includes a polymer of a vinyl aromatic monomer and an unsaturated carboxylic reagent (B1ii). (B1ii) is typically present in an amount from about 10%, or about 15% up to about 30%, or to about 25% by weight of the polymer composition. The vinyl aromatic monomers and unsaturated carboxylic reagents are described above. (See Polymers (Ai) and (Aii)). Preferably, the unsaturated carboxylic reagent is a maleic reagent, such as maleic acid, imide, or anhydride.

Block Polymers (B1iii)

The polymer composition (B1) includes a block polymer of a vinyl aromatic monomer and a conjugated diene, or a partially hydrogenated derivative thereof, or a selectively hydrogenated derivative thereof to which has been grafted a unsaturated carboxylic reagent. (B1iii) is generally present in an amount from about 5%, or about 8% up to about 20%, or to about 15% by weight. The vinyl aromatic monomers and the conjugated dienes are described above. (See Polymers (Ai) and (Aii)). In one embodiment, the block polymer is a multiblock polymer. A particularly useful multiblock polymer is Stereon 841, available commercially from The Firestone Tire & Rubber Company.

Polymer Composition (B2)

The core layer may also be formed from a polymer composition comprising (i) from about 50% to about 80% by weight of a polyolefin, (ii) from about 10% to about 30% by weight of a homopolymer of a vinyl aromatic monomer, or a polymer of a vinyl aromatic monomer and at least one monomer selected from the group consisting of acrylic acid or ester, methacrylic acid or ester, acrylonitrile and maleic anhydride; (iii) from about 5% to about 20% by weight of at least one block polymer of a vinyl aromatic monomer and an aliphatic conjugated diene, a partially hydrogenated derivative thereof, or a selectively hydrogenated derivative thereof to which has been grafted a unsaturated carboxylic reagent. The polyolefin (B2i), polymer of a vinyl aromatic monomer (B2ii) and the block polymer (B2iii) are described above. (B2i) is generally present in an amount from about 50%, or about 55%, or about 60% up to about 80%, or to about 75%, or to about 72% by weight. (B1ii) is typically present in an amount from about 10%, or about 15% up to about 30%, or to about 25% by weight of the polymer composition. (B1iii) is generally present in an amount from about 5%, or about 8% up to about 20%, or to about 15% by weight.

Polymer Composition (B3)

The core layer of the multilayer structure may also be prepared from a polymer composition comprising (i) from about 70% by weight of at least one polyolefin, (ii) from about 5% to about 30% by weight of a block polymer of a vinyl aromatic compound and a conjugated diene, a partially hydrogenated derivative thereof, or a selectively hydrogenated derivative thereof to which has been grafted a unsaturated carboxylic reagent, wherein the block polymer is derived from at least about 60% by weight bound vinyl aromatic monomer; and (iii) from about 0.3% to about 15% by weight of a block polymer of a vinyl aromatic compound and a conjugated diene, a partially hydrogenated derivative thereof, or a selectively hydrogenated derivative thereof to which has been grafted a unsaturated carboxylic reagent, wherein the polymer contains up to about 50% by weight bound vinyl aromatic monomer.

The inventors have discovered that the combination of the block polymers with different levels of aromatic content provides improved properties in combination, especially with the polyolefins. The polyolefins (B3i) and the block polymer (B3iii) are described above. (See Polyolefin (B1i) and Block Polymer (Aii), respectively). The low aromatic content block polymers are described above (see (Aii)). The high aromatic content block polymers are described above (see (Aiii)). Generally, (B3i) is present in an amount from about 70%, or about 75%, or about 80% up to about 95%, or to about 90%, or to about 88% by weight. (B3ii) is typically present in an amount from about 5%, or about 10% up to about 30%, or to about 25%, or to about 20% by weight. (B3iii) is typically present in an amount from about 0.3%, or about 0.5% up to about 15%, or about 10% by weight. In one embodiment, (B1iii) is present in an amount from about 0.3%, or about 0.5% up to 2%, or to about 1.5%, or to about 1% by weight.

The high aromatic content block polymer include high styrene content block polymers, such as Stereon 900 available from The Firestone Tire & Rubber Company. The polymer is believed to be derived from about 70% to about 80% by weight styrene.

Fillers (C)

The above polymer layers may contain one or more fillers of the type used in the polymer art. Examples of fillers employed in a typical compounded polymer blend according to the present invention include talc, calcium carbonate, mica, wollastonite, dolomite, glass fibers, boron fibers, carbon fibers, carbon blacks, pigments such as titanium dioxide, or mixtures thereof. Preferred fillers are a commercially available talc such as R. T. Vanderbilt's Select-A-Sorb, Jet Fil and glass fibers. The amount of filler included in the blended polymers may vary from about 1% to about 70% of the combined weight of polymer and filler. Generally amounts of 5% to about 45%, preferably about 30% to about 40%, are included.

The fillers may be treated with coupling agents to improve the bond between the fillers to the resin. For example, the fillers can be treated with materials such as fatty acids (e.g., stearic acid), silanes, maleated polypropylene, etc. The amount of coupling agent used is an amount effective to improve the bond between the fillers with the resin.

Preparation of Polymer Blends

The blended polymer compositions of the present invention can be prepared by techniques well known to those skilled in the art. For example, a particularly useful procedure is to intimately mix the polymers using conventional melt mixing equipment such as a mill, a Banbury, a Brabender, a single or twin screw extruder, continuous mixers, kneaders, etc. For example, the polymers may be intimately mixed in the form of granules and/or powder in a high shear mixer. One preferred process for preparing the blended polymers utilizes the Farrell Compact Processer, CP-23 and CP-57. Short residence times and high shear are readily obtained in a CP-23 and a CP-57. "Intimate" mixing means that the mixture is prepared with sufficient mechanical shear and thermal energy to produce a dispersed phase which is finely divided and homogeneously dispersed in the continuous or principal phase.

The layers such as the cap and core layers be applied by co-extrusion, laminating, etc., or the second layer can be applied from a solution or a dispersion of the cap in water or an organic liquid such as acetone. On drying, a film or cap layer is left on the layer comprising the composition of the invention. In another embodiment, multilayered structures can be prepared by co-extrusion.

Thermoformed articles having desired shapes can be produced from each of the blended polymer compositions of the present invention by (A) feeding a sheet of the blended polymer composition of the invention to a heating station;

(B) heating the sheet to its softening point; and (C) feeding the softened sheet to a forming station where it is thermoformed into articles of the desired shape.

The present invention also includes polymer compositions. More specifically, the invention includes a polymer composition comprising (i) at least about 55% by weight of a homopolymer of a vinyl aromatic monomer, or a polymer of a vinyl aromatic monomer and at least one monomer selected from the group consisting of a mono- or dicarboxylic reagent and other vinyl monomers, (ii) from about 1% to about 45% by weight of at least one block polymer of a vinyl aromatic monomer and an aliphatic conjugated diene, a selectively hydrogenated derivative thereof, or a selectively hydrogenated derivative thereof to which has been grafted a unsaturated carboxylic reagent, wherein the block polymer contains up to about 50% by weight bound styrene, and (iii) from about 0.3% to about 45% by weight of at least one block polymer of a vinyl aromatic monomer and a conjugated diene, a partially hydrogenated derivative thereof, or a selectively hydrogenated derivative thereof to which has been grafted a unsaturated carboxylic reagent, wherein the block polymer contains greater than about 60% by weight bound vinyl aromatic monomer. The polymer composition is used in making the cap layer and is described above. The invention also includes polymer composition comprising (i) from about 70% by weight of at least one polyolefin, (ii) from about 5% to about 30% by weight of a block polymer of a vinyl aromatic compound and a conjugated diene, a partially hydrogenated derivative thereof, or a selectively hydrogenated derivative thereof to which has been grafted a unsaturated carboxylic reagent, wherein the block polymer is derived from at least about 60% by weight bound vinyl aromatic monomer; and (iii) from about 0.3% to about 15% by weight of a block polymer of a vinyl aromatic compound and a conjugated diene, a partially hydrogenated derivative thereof, or a selectively hydrogenated derivative thereof to which has been grafted a unsaturated carboxylic reagent, wherein the polymer is derived from up to about 50% by weight bound vinyl aromatic monomer. The polymer composition is described above as (B3) and is used in making the core layer.

Various features and aspects of the present invention are illustrated further in the examples that follow. While these examples are presented to show one skilled in the art how to operate within the scope of this invention, they are not to serve as a limitation on the scope of the invention where such scope is only defined in the claims. Moreover, in the following examples, preparation of blends, compounds, injection molded specimens, mono layer or laminated sheets are illustrated. These examples serve merely as illustrative embodiments of the present invention and are not to be considered limiting.

Unless otherwise indicated in the following examples and elsewhere in the specification and claims, all parts and percentages are by weight, temperatures are in degrees centigrade and pressures are at or near atmospheric.

EXAMPLES 1-12

Blended polymer compositions in accordance with the present invention are prepared on a Farrell Compact Processer, CP-57 at a mixer rotor speed of 500 rpm and extruded at about 220° C. into strands which are passed through a water bath and air wipe prior to pelletizing. Examples 1-6 relate to polymer compositions useful in preparing the cap layer of the multilayer structure. Examples 7-12 relate to polymer compositions useful as core layers.

|  | 1 | 2 | 3 | 4 | 5 | 6 |
|---|---|---|---|---|---|---|
| Dart 108 (PS) | 60 | 60 | 60 | 65 | 65 | 70 |
| Stereon 841 (43% styrene) | 10 |  |  |  |  |  |
| Kraton FG1901X (Maleated SEBS) |  | 10 |  | 21.9 | 17.5 | 18.7 |
| Kraton G1701x | 10 |  | 5 |  |  |  |
| Phillips KR 03 (75% Styrene) | 20 |  | 20 | 13.1 |  | 11.3 |
| Stereon 900 (73.5% Styrene) |  | 15 | 15 |  |  |  |
| Stereon 881 (78% Styrene) |  | 15 |  |  | 17.5 |  |

The following table contains polymer compositions which are useful in preparing the core layer of the multilayer structure.

|                          | 7    | 8     | 9    | 10    | 11   | 12   |
|--------------------------|------|-------|------|-------|------|------|
| Aristech TI-4007 (PP)    | 67.7 | 38.86 | 67.7 | 38.86 |      |      |
| Aristech F007S (PP)      |      |       |      |       | 84.2 | 55.7 |
| Dart 108 (PS)            |      |       | 21.5 | 12.36 |      |      |
| Arco Dylark 250 (SMA)    | 21.5 | 12.36 |      |       |      |      |
| Stereon 841 (SB Block)   | 10.8 | 6.18  |      |       | 0.7  | 0.5  |
| Stereon 900 (SB Block)   |      |       |      |       | 15.1 | 10   |
| Kraton FG1901X (Maleated SEBS) |   |    |      |       |      |      |
| Phillips KR 03 (SB Block) |     |       |      |       |      | 10   |
| Finaprene 414 (SB Block) |      |       | 10.8 | 6.18  |      |      |
| ECC Supercoat (CaCO$_3$) |      | 40    |      | 40    |      |      |
| Polar 9110 (Talc)        |      |       |      |       |      | 31   |
| TiO$_2$                  |      | 2.5   |      | 2.5   |      |      |
| Lubricant                |      |       |      |       |      | 0.7  |
| Stabilizer               |      | 0.1   |      | 0.1   |      | 0.1  |

EXAMPLE 13

A multilayer structure is made by coextruding polymer compositions Examples 6 and 12 above. The polymer composition of Example 12 is placed in an extruder and heated to a melt temperature 220° C. The extruder is operating at 100 RPM and has a head pressure of 2000 psi. The composition of Example 12 is prepared in a co-extruder. The co-extruder is operating at 125 RPM and has a head pressure of 1750 psi. The polymer compositions are co-extruded through a sheet die at 205° C. The polymers form a multilayer sheet.

EXAMPLE 14

The multilayer structure from Example 13 is placed in a standard vacuum forming equipment. The sheet is heated to 177° C. until the sheet sags about 6 to 13 mm. The mold is closed to form a thermoformable article.

EXAMPLE 15

An extruded sheet prepared as in Example 13 with the composition of Example 5 is heat laminated with an extruded sheet of the product of example 7 prepared by the procedure of example 8 and subsequently thermoformed into cups in a single operation.

EXAMPLE 16

A two-layer laminate is prepared in the following manner. A 40 mil sheet of the composition of Example 2 is prepared by extrusion. To this sheet is heat laminated a 12 mil cap layer of example 6.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A multilayer thermoformable structure comprising
   (A) at least one cap layer of a polymer composition comprising (i) at least about 55% by weight of a homopolymer of a vinyl aromatic monomer, or a polymer of a vinyl aromatic monomer and at least one monomer selected from the group consisting of a mono- or dicarboxylic reagent and other vinyl monomers, (ii) from about 0% to about 45% by weight of at least one block polymer of a vinyl aromatic monomer and an aliphatic conjugated diene, a selectively hydrogenated block polymer of a vinyl aromatic monomer and an aliphatic conjugated diene, or a selectively hydrogenated block polymer of a vinyl aromatic monomer and an aliphatic conjugated diene to which has been grafted a unsaturated carboxylic reagent, wherein the block polymer contains up to about 50% by weight bound styrene, and (iii) from about 0% to about 45% by weight of at least one block polymer of a vinyl aromatic monomer and a conjugated diene, a partially hydrogenated block polymer of a vinyl aromatic monomer and a conjugated diene, or a selectively hydrogenated block polymer of a vinyl aromatic monomer and a conjugated diene to which has been grafted a unsaturated carboxylic reagent, wherein the block polymer contains greater than about 60% by weight bound vinyl aromatic monomer, with the proviso that the cap layer includes at least one of (Aii) or (Aiii); and
   (B) at least one core layer selected from the group consisting of
   (1) at least one polymer composition comprising (i) from about 50% to about 80% by weight of at least one polyolefin, (ii) from about 10% to about 30% by weight of a polymer of a vinyl aromatic compound and an unsaturated dicarboxylic acid anhydride or imide, or mixtures thereof; and (iii) from about 5% to about 20% by weight of a block polymer of a vinyl aromatic compound and a conjugated diene, a partially hydrogenated block polymer of a vinyl aromatic monomer and a conjugated diene, or a selectively hydrogenated block polymer of a vinyl aromatic monomer and a conjugated diene to which has been grafted a unsaturated carboxylic reagent;
   (2) at least one polymer composition comprising (i) from about 50% to about 80% by weight of a polyolefin, (ii) from about 10% to about 30% by weight of a homopolymer of a vinyl aromatic monomer, or a polymer of a vinyl aromatic monomer and at least one monomer selected from the group consisting of acrylic acid or ester, methacrylic acid or ester, acrylonitrile and maleic anhydride; (iii) from about 5% to about 20% by weight of at least one block polymer of a vinyl aromatic monomer and an aliphatic conjugated diene, a partially hydrogenated block polymer of a vinyl aromatic monomer and an aliphatic conjugated diene, or a selectively hydrogenated block polymer of a vinyl aromatic monomer and an aliphatic conjugated diene to which has been grafted a unsaturated carboxylic reagent;
   (3) at least one polymer composition comprising (i) from about 70% by weight of at least one polyolefin, (ii) from about 5% to about 30% by weight of a block polymer of a vinyl aromatic compound and a conjugated diene, a partially hydrogenated block polymer of a vinyl aromatic monomer and a conjugated diene, or a selectively hydrogenated block polymer of a vinyl aromatic monomer and a conjugated diene to which has been grafted a unsaturated carboxylic reagent, wherein the block polymer is derived from at least about 60% by weight bound vinyl aromatic monomer; and (iii) from about 0.3% to about 15% by weight of a block polymer of a vinyl aromatic compound and a conjugated diene, a partially hydrogenated block polymer of a vinyl aromatic monomer and a conjugated diene, or a selectively hydrogenated block polymer of a vinyl aromatic monomer and a conjugated diene to which has been grafted a unsaturated carboxylic reagent, wherein the polymer is derived from up to about 50% by weight bound vinyl aromatic monomer.

2. The structure of claim 1 wherein (Ai) is polystyrene.

3. The structure of claim 1 wherein the vinyl aromatic monomer of (A) and (B) is styrene and the conjugated diene of (A) and (B) is independently selected from the group consisting of butadiene and isoprene.

4. The structure of claim 1 wherein the unsaturated carboxylic reagent of (A) and (B) is an unsaturated dicarboxylic reagent.

5. The structure of claim 1 wherein the unsaturated carboxylic reagent of (A) and (B) is maleic acid or anhydride.

6. A multilayer thermoformable structure comprising
(A) at least one cap layer of a polymer composition comprising (i) at least about 55% by weight of a homopolymer of a vinyl aromatic monomer, (ii) from about 10% to about 30% by weight of at least one selectively hydrogenated block polymer of a vinyl aromatic monomer and an aliphatic conjugated diene to which has been grafted a unsaturated carboxylic reagent, and (iii) from about 5% to about 15% by weight of at least one block polymer of a vinyl aromatic monomer and a conjugated diene or a partially hydrogenated derivative thereof; and
(B) at least one core layer selected from the group consisting of
(1) at least one polymer composition comprising (i) from about 50% to about 80% by weight of polypropylene or an ethylene-propylene polymer, (ii) from about 10% to about 30% by weight of a polymer of a vinyl aromatic compound and an unsaturated dicarboxylic acid anhydride or imide, or mixtures thereof; and (iii) from about 5% to about 20% by weight of a block polymer of a vinyl aromatic compound and a conjugated diene, or a partially hydrogenated block polymer of a vinyl aromatic monomer and a conjugated diene;
(2) at least one polymer composition comprising (i) from about 50% to about 80% by weight of polypropylene or an ethylene-propylene copolymer, (ii) from about 10% to about 30% by weight of a homopolymer of a vinyl aromatic monomer; (iii) from about 5% to about 20% by weight of at least one block polymer of a vinyl aromatic monomer and an aliphatic conjugated diene, or a partially hydrogenated block polymer of a vinyl aromatic monomer and an aliphatic conjugated diene;
(3) at least one polymer composition comprising (i) from about 70% by weight of polypropylene or an ethylene-propylene copolymer; (ii) from about 5% to about 30% by weight of a high vinyl aromatic content block polymer of a vinyl aromatic compound and a conjugated diene, or a partially hydrogenated block polymer of a vinyl aromatic monomer and a conjugated diene, wherein the block polymer is derived from at least about 60% by weight bound vinyl aromatic monomer; and (iii) from about 0.3% to about 15% by weight of a block polymer of a vinyl aromatic compound and a conjugated diene, or a partially hydrogenated block polymer of a vinyl aromatic monomer and a conjugated diene, wherein the polymer is derived from up to about 50% by weight bound vinyl aromatic monomer.

7. The structure of claim 6 wherein the vinyl aromatic monomer of (A) and (B) is styrene and the conjugated diene of (A) and (B) is independently selected from the group consisting of butadiene and isoprene.

8. The structure of claim 6 wherein the cap layer (A) comprises a polymer composition comprising (i) from about 55% by weight of polystyrene, (ii) from about 10% to about 30% by weight of a selectively hydrogenated block polymer of styrene and isoprene or butadiene to which has been grafted maleic acid or anhydride, and (iii) from about 5% to about 15% by weight of a block polymer of styrene and isoprene or butadiene, or a partially hydrogenated block polymer of styrene and isoprene or butadiene.

9. The structure of claim 6 wherein the core layer (B) comprises the polymer composition (1), wherein (i) is polypropylene, (ii) is a polymer of styrene and maleic acid or anhydride, and (iii) is a block polymer of styrene and isoprene or butadiene, or a partially hydrogenated derivative thereof.

10. The structure of claim 6 wherein the core layer comprises the polymer composition (B2), wherein (i) is polypropylene, (ii) is polystyrene, and (iii) is a block polymer of styrene and isoprene or butadiene, or a partially hydrogenated derivative thereof.

11. The structure of claim 6 wherein the core layer comprises the polymer composition (B3), wherein (i) is polypropylene, and (ii) and (iii) are independently a block copolymer of styrene and isoprene or butadiene, or a partially hydrogenated derivative thereof.

12. The structure of claim 6 wherein the core layer (B) further comprises (D) at least one filler.

13. The structure of claim 12 wherein the filler is talc, calcium carbonate or glass fiber.

* * * * *